US011978066B2

(12) United States Patent
Metcalf

(10) Patent No.: US 11,978,066 B2
(45) Date of Patent: *May 7, 2024

(54) METHOD FOR EXPEDITING DUAL-COMMERCE AVAILABLE DELIVERABLE FULFILLMENTS WITH EITHER OR BOTH A WEBSITE, AN ECOMMERCE APPLICATION, ASSOCIATED WITH AN ECOMMERCE SERVICE PROVIDER

(71) Applicant: EXPEDITED DUAL COMMERCE LLC, Austin, TX (US)

(72) Inventor: Darrell Metcalf, Rohnert Park, CA (US)

(73) Assignee: EXPEDITED DUAL COMMERCE LLC, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/191,906

(22) Filed: Mar. 29, 2023

(65) Prior Publication Data

US 2023/0237510 A1  Jul. 27, 2023

Related U.S. Application Data

(63) Continuation of application No. 12/262,007, filed on Oct. 30, 2008, now Pat. No. 11,682,027, which is a (Continued)

(51) Int. Cl.
*G06Q 30/02* (2023.01)
*G06Q 10/02* (2012.01)
(Continued)

(52) U.S. Cl.
CPC ............. *G06Q 30/02* (2013.01); *G06Q 10/02* (2013.01); *G06Q 10/0637* (2013.01); *G06Q 30/0601* (2013.01); *G06Q 50/12* (2013.01)

(58) Field of Classification Search
CPC .... G06Q 30/02; G06Q 10/02; G06Q 10/0637; G06Q 30/0601; G06Q 50/12
(Continued)

(56) References Cited

U.S. PATENT DOCUMENTS 3,225,144 A * 12/1965 Gebhardt ........... H04Q 11/0407
370/263
5,537,524 A * 7/1996 Aprile ..................... G06T 17/00
345/440
(Continued)

FOREIGN PATENT DOCUMENTS

FR          2775860  A1 *  9/1999  ............. H04N 5/782
WO   WO-9858345  A2 * 12/1998  ............. G06Q 20/04
(Continued)

OTHER PUBLICATIONS

Pattie Maes, "Agents that buy and sell," 1999, Communications of the ACM, vol. 42, No. 3, p. 81-91. (Year: 1999).*

(Continued)

*Primary Examiner* — Tan D Nguyen
(74) *Attorney, Agent, or Firm* — Dana Legal Services; Jubin Dana

(57) ABSTRACT

A system and method for expediting fulfillments of online ordered dual-commerce available deliverables at one or more expedited service areas (ESAs) of a networked venue facility associated with an ecommerce service provider (ESP) where a sequenced deliverable pickup fulfillment or procurement access is provided within a specified time-window, and/or by delivery fulfillments made to specific locations.

26 Claims, 5 Drawing Sheets

Related U.S. Application Data continuation of application No. 09/617,156, filed on Jul. 17, 2000, now abandoned.

(60) Provisional application No. 60/144,210, filed on Jul. 19, 1999.

(51) Int. Cl.
| | | |
|---|---|---|
| *G06Q 10/06* | (2023.01) | |
| *G06Q 10/0637* | (2023.01) | |
| *G06Q 30/06* | (2023.01) | |
| *G06Q 30/0601* | (2023.01) | |
| *G06Q 50/12* | (2012.01) | |

(58) Field of Classification Search
USPC .......................................................... 705/5
See application file for complete search history.

(56) References Cited

U.S. PATENT DOCUMENTS

| | | | | | |
|---|---|---|---|---|---|
| 5,848,068 | A | * | 12/1998 | Daniel | H04Q 11/0478 370/395.43 |
| 5,850,526 | A | * | 12/1998 | Chou | H04L 69/04 709/228 |
| 5,854,450 | A | * | 12/1998 | Kent | G06F 3/0418 345/177 |

FOREIGN PATENT DOCUMENTS

| | | | | |
|---|---|---|---|---|
| WO | WO-9858516 A1 | * | 12/1998 | ......... H04L 12/4637 |
| WO | WO-9859308 A1 | * | 12/1998 | ............. G06Q 20/04 |
| WO | WO-0058883 A2 | * | 10/2000 | ......... G06Q 20/3272 |

OTHER PUBLICATIONS

David F. Pyke, "Performance Characteristics of Stochastic Integrated Production-Distribution Systems" 1993, European Journal of Operational Research 68, pp. 23-48. (Year: 1993).*

Peter Fingar, "21st Century Markets: From Places to Spaces", 1999, Peer-Reviewed Journal on the Internet, pp. 1-2. (Year: 1999).*

2000 Circuit City Annual Report (est. Dec. 2000), p. 5.

2000 Circuit City Annual Report (est. Dec. 2000), p. 13-14.

2000 Circuit City Annual Report (est. Dec. 2000), p. 15.

Circuit City Website, http://web.archive.org/web/19991011064029/http://circuitcity.com/init.jsp, Oct. 11, 1999.

Circuit City Website, http://web.archive.org/web/20000520012309/http://www.circuitcity.com:80/init.jsp, May 20, 2000.

Daily News "the Electronics Buzz", Newspapers.com, https://www.newspapers.com/image/479683093/.

New York Times, "Circuit City on the Web". Dec. 25, 1999, https://timesmachine.nytimes.com/timesmachine/1999/07/22/713457.html?pageNumber=32.

New York Times, Dec. 25, 1999, "Increasingly, Traditional Retailers Take That Internet Plunge." Printed Publication.

* cited by examiner

METHOD FOR EXPEDITING DUAL-COMMERCE AVAILABLE DELIVERABLE FULFILLMENTS WITH EITHER OR BOTH A WEBSITE, AN ECOMMERCE APPLICATION, ASSOCIATED WITH AN ECOMMERCE SERVICE PROVIDER

CROSS REFERENCE TO RELATED APPLICATION

This application is a continuation of U.S. patent application Ser. No. 12/262,007 filed on Oct. 30, 2008, which is a continuation of U.S. patent application Ser. No. 09/617,156 filed on Jul. 17, 2000, which claims priority to U.S. Provisional Patent Application Ser. No. 60/144,210 filed Jul. 19, 1999, the disclosures of which are all hereby incorporated by reference as if fully set forth herein.

TECHNICAL FIELD

The present technology is in the field of electronic commerce and, more specifically, related to fulfillments of online ordered dual-commerce available deliverables.

BACKGROUND

This invention is related to the field of network-facilitated commerce systems, and in particular to a system and method for expediting commerce with internet browsing apparatus and ordering, reserving and scheduling networked-computer systems to achieve a dual-commerce system and method between a large-scale network and one or more physical venues offering merchandise, services and/or activities. The system communicates via a network such as the international global network (Internet) to coordinate and automate and consolidate online transactions, or interactions, and to schedule and/or sequence reservable excursions to expedite transactions, or interactions, at any of a variety of venues, including those providing multiple points of interest, or multiple customer transactions, or interactions. The invention further pertains to venues having scalable designated 'Expedited Service Areas' at, or near to, their locations to provide scheduled transaction, or interaction, services to attendees who have—prior to their arrival at the venue-location—employed the system to order, schedule or reserve one or more venue deliverables, such as goods, services, and/or activities. In one embodiment of the invention, the browsing apparatus includes a handheld device having wireless communications capability for further enhancing attendee or customer interaction, convenience and the expediting of their schedulable visits to venues and their points of interest. The system also optimizes attendee or customer flow rates such that venue staffing can be optimally and respectively scheduled according to the degree of scheduled attendee or customer traffic at each venue.

SUMMARY

In recent years developers of mall-based facilities and store chains have been faced with numerous challenges relating to the need to improve the customers' experience when shopping at such facilities. Often such experiences are quite frustrating, for example, due to congestion, parking difficulties, or finding out upon arriving at a venue that items are out of stock or aren't available in desired sizes, or that services or activities thought to be available before one's arrival are in fact not available when one arrives at a given venue. From a business owner perspective, other problems are prevalent. Various venues including, mall-based facilities and facilities incorporating a plurality of stores, or store-chains, have little or no means to optimize a traffic flow of customers and are often left with having to make a best-guess estimate of the number of staff personnel that will be required in a store for a given time of the week, month, or season of the year. Thus, such stores can often become either understaffed resulting in long lines and unproductive delays for their customers, or can be overstaffed which can significantly affect the profits of the business. Thus, such stores can often become either understaffed resulting in long lines and unproductive delays for their customers, or can be overstaffed which can significantly affect the profits of the business. It, therefore, would be preferable to plan and build networked-venues having the means to substantially improve the customers' and merchants' experience, to provide expedited and schedulable customer interactions at a variety of venues such as those located within malls, entertainment complexes, or other facilities offering products, services and/or activities. And to optionally do so in engaging and entertaining ways. Furthermore, it would be preferable to business owners to have some means for optimizing staffing according to a schedulable flow of expedited customer interactions within their respective stores, service centers, or other venues.

The present invention is illustrated in the context of physical venue commerce which is facilitated and expedited by a networked communication with browsing apparatus to achieve a dual-commerce system and method. The browsing apparatus communicates via a networkable connection means such as a networked connection offered by an Internet Service Provider (ISP) and employs a web-browsing software program such as Microsoft® Internet Explorer®, or Netscape Navigator®. The system provides an online software user interface such as a Web Portal (or downloadable web browsing application or interface) which communicates with network-formatted information pertaining to the availability and purchasing details of deliverables offered at one or more networked-venues. Such information is stored in computer-accessible storage means to provide customer-access to current databased data pertaining to product-related transactions, and current databased activity(s) and/or service(s) availability data for available activity(s) and/or service(s) transactions. The system's browsing apparatus, includes any of a variety of devices that are made for network browsing, including: computers; handheld personal information devices; cell phones and/or pagers; and the like. When connected to the system, the browser apparatus provides selection, ordering, and/or reservation of deliverables such as products, services and/or activities offered at one or more participating venues networked to the system. Such networked-venues can include any of a variety of product, activity(s) and/or service(s) venues such as those found at entertainment complexes, mall-based facilities, amusement parks, convention centers, stadiums, arenas, a store, or store-chain, service(s) or activity(s) facility, and the like. The system's browsing apparatus connects with an online software user interface which communicates with at least one networked-computer at each participating networked-venue. The venue's networked computer(s) and software facilitate the selection, ordering, reserving and transaction confirmation of that venue's available deliverables. Online ordering of the venue'(s) deliverables are confirmed and recorded during each customer transaction and the record-keeping data pertaining to selected and reserved deliverables are updated real-time by the software, e.g., instantly adjusting the system's databased inventory record in the case of purchased merchandise; or, instantly adjusting service(s) availability or activity(s) availability during either of such transactions. A scalable designated area, for example an "Expedited Service Area" is provided at each networked-venue's location for expediting and culminating interactions customers have reserved online. The system's software includes a reservation and scheduling means that query an updateable chronological software table of scheduled and available customer-events at networked-venues to reserve, schedule and sequence itineraries for customers whose transactions or interactions are to occur at one or more locations, or places. The reservation and scheduling means includes the means to create and adjust itineraries (whenever possible) around a customer's preferred schedule, or when a preferred schedule is not available, to provide schedules around a choice of one or more 'best-fit' (i.e. best available) itineraries. After completing and confirming one or more orders online that will be culminated at one or more networked-venues, the customer then selects the best available itinerary and the system's software provides the customer the choice to either download the itinerary, for example to be used in a wireless handheld device, or print out an itinerary record (by downloading it and printing it, or by printing it out from the Internet browser software). The schedulable itineraries provide highly convenient excursions which eliminate shopping frustrations due to congestion, parking difficulties (parking is schedulable), or finding out upon arriving at a venue that items are out of stock or aren't available in desired sizes, or that services or activities thought to be available before one's arrival are in fact not available when one arrives at a given venue.

Additionally, one or more facilities having the system's network-enabled venues can also be equipped with customer interfacing means suitable for establishing a bi-directional communications link to thereby confirm customer identification (I.D.) so that further transactions or changes to scheduled sequenced steps can be made at such locations. Such interfacing means can include any one or more of a variety of known or commercially available input, or input/output (I/O) devices such as: an ATM-style interface; kiosk interface; or, other interface with one or more of the following input and/or output devices: a magnetic card-strip reader, or financial transaction card reader (e.g. for reading financial transaction card information, or credit card and/or membership card information); electronic-signature pad; a computer-interfaced keyboard, a computer-interfaced keypad, a PIN entry keypad, or wireless device transmission interface suitable for Infrared (IR) I/O, or other type of radio wave I/O (e.g., 'Blue Tooth'), and the like. With the employment of any one or more of a variety of customer interface means, the identified customer can further edit, add to, amend or reschedule itineraries. Thus a highly efficient reservation and scheduling system is provided which allows customers to conveniently move from networked-venue to networked-venue; from one point of interest to another; from one location to another; or, one place to another. For example, upon arriving at a facility equipped with the system and method of the present invention, customer itineraries (whether printed out, or downloaded into mobile handheld devices) can direct identified customers to a reserved parking spot and then to each scheduled interaction/activity and/or service. The customer is guaranteed online-reserved and confirmed orders for products, services and/or activities upon confirming their desired order and best-available itinerary, and is given the option when possible to also order deliverables online for home delivery. In the latter case, the customer is provided a means through the software of the system to shop, or order, from online representations of the deliverables of participating networked-venues, and to consolidate a plurality of such online orders from different participating venues into a one-time order procedure. It is the current practice of eCommerce sites on the Internet to require a separate 'checkout' procedure for the shopping or ordering of deliverables in different categories, for example a book purchase from an eCommerce book seller website requires a separate checkout (ordering) procedure from the purchase of flowers from a separate online florist's website. By contrast, the present invention facilitates diverse deliverables ordering from separate-but-participating online-represented venues and consolidates the plurality of orders into expedited one-time order procedures. For example, a book, a DVD, and a dress, each sold by (and shown as available) by different online sellers is consolidated into a single online invoice or receipt indicating the separate price of each deliverable and the cumulative price (and where applicable the sales tax). The system's software automatically places the order with each seller (and optionally notifies their supplier of the sale) and deducts those deliverables from the available inventory. The software tracks the scheduled customer flow-rate at any participating venue and provides an optimum/known flow of customers from which each participating venue can more accurately predict and schedule required personnel. Thus, any expedited service area can be scheduled up to 100% capacity. The Expedited Service Area designated in any given venue is also optionally scalable to allow more customer transactions and/or interactions as more customers use the system's dual-commerce services to plan and schedule their network-enabled excursions. Such scalability provides a means for venues to operate at an optimum and known (scheduled) customer flow rate without the log-jamming experienced by customers at typical venues that are operated at full, or near to full, capacity.

Customers experience the benefits of guaranteed availability of deliverables whether purchased online and consolidated into a single-entry ordering procedure (which is then delivered to their homes or places of work), or when ordered and retrieved in highly convenient, schedulable excursions from Expedited Service Areas. Merchants experience optimized customer flow and flow rates to networked-venues and more predictable staffing needs. Merchants are also sent new and repeat customers and know in advance who, when and how many customers are being sent. Many of these customers who might otherwise not have come to a conventional physical venue—and perhaps simply shopped online at a potential low-priced competitor's website—are attracted by a new customer experience offering unprecedented efficiency and time-saving convenience. Merchant's suppliers are optionally notified automatically by the system's software as to the merchants' restocking needs (e.g. by a networked order to a suppliers computer, by email, by fax, or by automated phone message, etc.).

It is the purpose of the present invention to address the shortcomings in existing and prevalent web-only commerce sites, and physical venue-only commerce, and to overcome the frustrations associated with, and experienced by, non-scheduled visitations of customers, or attendees, and to instead provide an efficient networked ordering, reservation and scheduling system for dual-commerce offering distinctive online, and physical venue customer and merchant experiences.

Several attempts have been made to provide improved customer interactions in retail environments and other physical venues, but the attempts have not been implemented in ways which were well coordinated for the customer(s) or the business owner(s), or in ways that used the power of an online network to order, reserve and schedule both online and physical venue transactions and/or interactions. The present invention consolidates ordering procedures and schedules optimal traffic flow when more than one facility, venue, or location of interest needs to be visited. By contrast, the previous methods have not implemented scheduling methods in a way that benefited both the store owner and the customer traveling between multiple venues. Additionally, they have not provided printable, or downloadable itineraries, or provided scheduling flexibility to amend, add to, or otherwise edit schedulable itineraries, transactions and/or interactions; or to download such schedules to convenient handheld devices which have various means for connectivity to a scheduling system.

From a customer perspective it has been possible to call by phone, ahead of time to arrange that a product, activity or service be reserved for pick up at a certain time. However, the customer has either done this ordering from memory, or from a static printed reference such as an ad or catalog, or from a very limited understanding of a facilities' entire offerings. Whereas, with the dual-commerce system and methods of the present invention it is possible for a customer to browse entire databased inventory(s) representing all available products, or all available services and/or activities, and to access such deliverables at one or a plurality of networked-venues, and to then schedule efficient sequenced visits (including the scheduling of reserved parking). Thus highly organized and efficient excursions to one or more venues, places of interest, malls, or complexes, and the like, are easily provided, and the inherent strengths of the Internet (or other network) to track and provide transaction accountability is employed by the dual-commerce system. Additionally, the coordinated scheduling makes it possible for store owners to enjoy network-enabled sales that send customers to the merchant's venue and to benefit from the knowledge of when such customers will arrive so that efficient staffing of the venues' personnel can also be achieved. Search of prior art has shown no systems, methods or apparatus to achieve such objects and advantages of the present invention, or its dual-commerce, order consolidating and scheduling/reservation methods including the system's capability to query an updateable software table of chronological scheduled and schedulable customer-events in order to schedule best-fit, or best available, downloadable itineraries for time-saving excursions to one or more networked-venues.

BRIEF DESCRIPTION OF THE DRAWINGS

FIG. 3 shows an interior top view of the venue's automated pick-and-place robotics and record-keeping/updateable system, which is accessible by workstation access, including one or more optional ATM-Style stations at an exterior wall adjacent near to the workstation system.

DETAILED DESCRIPTION

The following describes various examples of the present technology that illustrate various aspects and embodiments of the invention. Generally, examples can use the described aspects in any combination. All statements herein reciting principles, aspects, and embodiments as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

It is noted that, as used herein, the singular forms "a," "an" and "the" include plural referents unless the context clearly dictates otherwise. Reference throughout this specification to "one aspect," "an aspect," "certain aspects," "various aspects," or similar language means that a particular aspect, feature, structure, or characteristic described in connection with any embodiment is included in at least one embodiment of the invention.

Appearances of the phrases "in one embodiment," "in at least one embodiment," "in an embodiment," "in certain embodiments," and similar language throughout this specification may, but do not necessarily, all refer to the same embodiment or similar embodiments. Furthermore, aspects and embodiments of the invention described herein are merely exemplary, and should not be construed as limiting of the scope or spirit of the invention as appreciated by those of ordinary skill in the art. The disclosed invention is effectively made or used in any embodiment that includes any novel aspect described herein. All statements herein reciting aspects and embodiments of the invention are intended to encompass both structural and functional equivalents thereof. It is intended that such equivalents include both currently known equivalents and equivalents developed in the future.

Figure 1A:
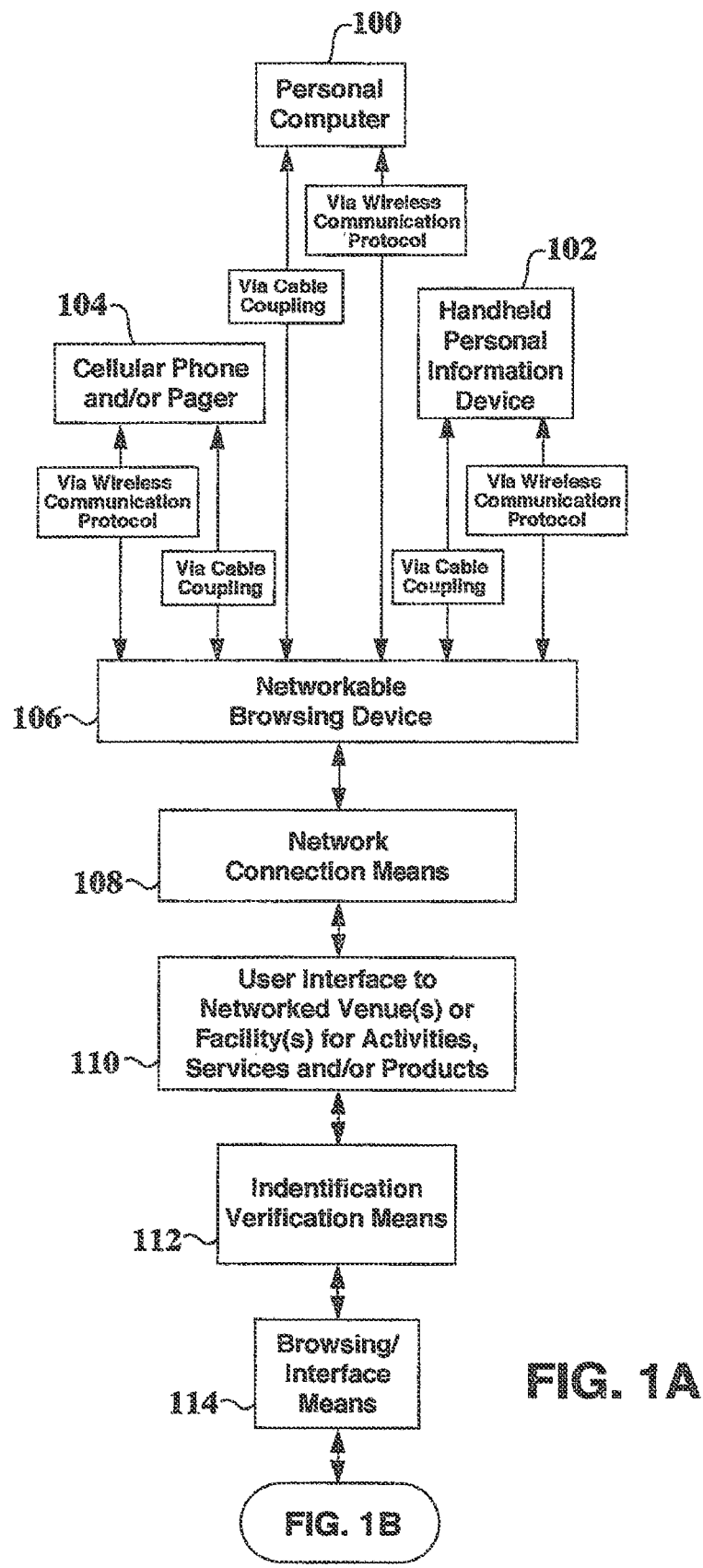
FIG. 1A is a diagrammatical flow chart showing various browsing devices that can be linked in bi-directional communication with: a network connection means such as an Internet Service Provider (ISP); a user interface such as a browser software application e.g. Microsoft® Internet Explorer® or Netscape Navigator®; an identification means; and, a browsing/interface means such as Internet Portal, all of which provide access to at least one networked-venue.
Figure 1B:
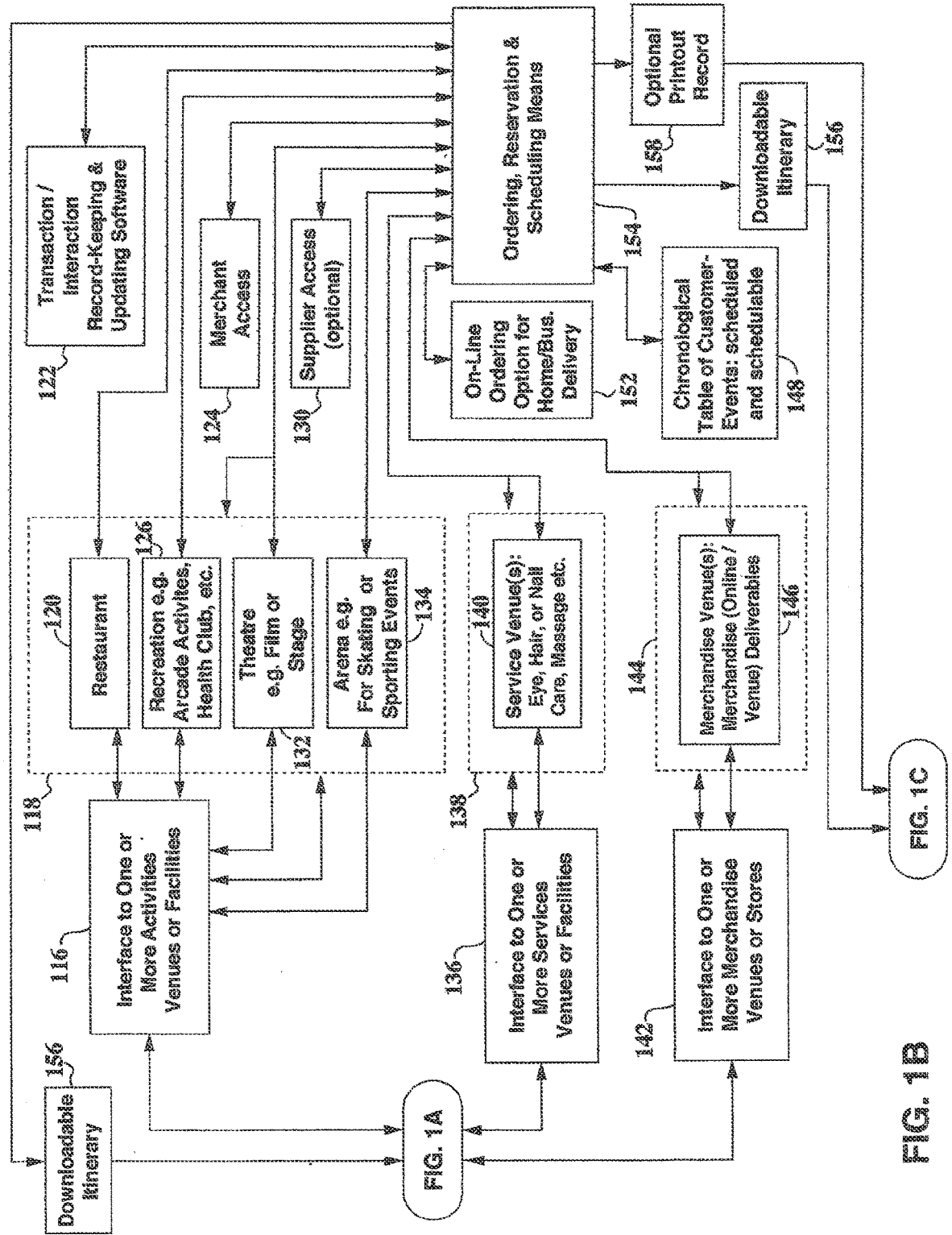
FIG. 1B is a continuation of the flow chart of FIG. 1A, whereby the browsing apparatus of FIG. 1A has bi-directionally linked communication with at least one interface to one or more activities, services and/or merchandise venue(s) and venue-condition editing, monitoring and reporting means, and an ordering, reservation and scheduling means to facilitate online ordering, home delivery of online deliverables, and to provide scheduled itineraries for the culmination of customer transactions or interactions at one or more networked-venue(s).
Figure 1C:
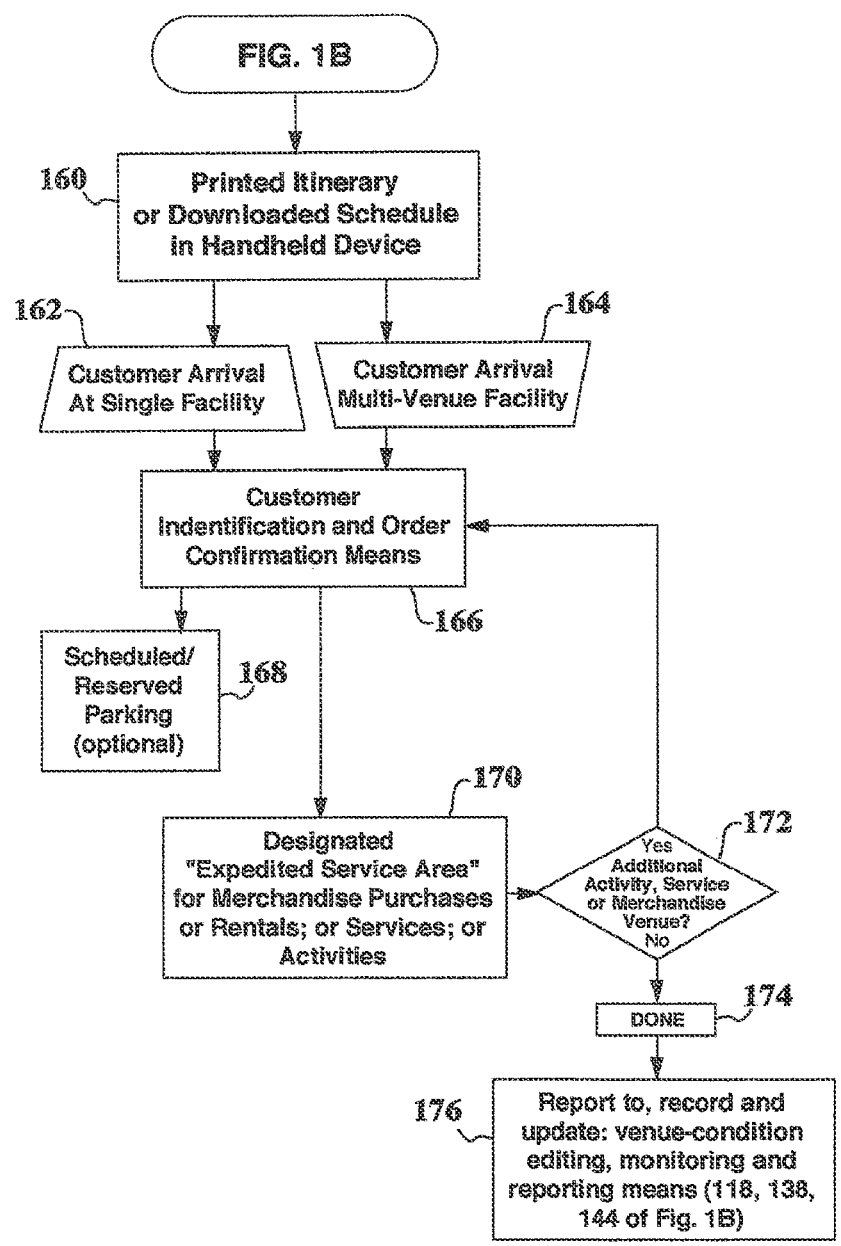
FIG. 1C is a continuation of the flow chart of FIG. 1B showing the sequence following the arrival of a customer having a printed itinerary, or alternatively a downloaded schedule in a handheld device, and his or her "Expedited" interaction with a single facility, or a multi-venue facility following customer identification and order confirmation.

FIGS. 1A, 1B and 1C collectively represent a preferred embodiment of the present invention as a dual-commerce system and method for ordering, scheduling and reservation of one or more customer transactions or interactions, and should be referred to sequentially and interchangeably to follow the descriptions below. In FIG. 1A various types of network browsing apparatus such as personal computer 100, handheld personal information device 102, and cellular phone and/or pager 104 represent one or more networkable browsing devices 106 that can be used to communicate with the system. The browsing devices have bi-directionally communication linkage via a wireless communications protocol, or via cable connections, to network connection means 108 such as an Internet Service Provider (ISP) or other provider of high-speed bandwidth connection to the Internet. Each of the browsing devices provides connection with a network such as those having an on-line protocol e.g. a transmission control protocol/internet protocol (i.e. "TCP/IP") but can alternatively be configured to connect with a variety of networks including LANs, WANs and the like. Network connection means 108 provides communication via a user interface 110 such as a web-browsing software program e.g. Microsoft® Internet Explorer®, or Netscape Navigator®. The web-browser provides communication with websites, Internet portals and the like via an identification verification means 112, such as any one or more of a variety of known software means for I.D. verification including user-entered passwords, keywords, user I.D. names, PIN numbers, and the like. Following I.D. verification, a user is granted access to browsing/interface means 114 such as an Internet portal or other Internet site which—continuing on to the flow chart in FIG. 1B—provides communication with one or more networked-venues via online representations of physical venues (i.e. venues having physical locations to receive and serve customers). Browsing interface means 114 provides communication with: interface to one or more activities venues or facilities 116; interface to one or more services venues or facilities 136; or, interface to one or more merchandise venues or facilities 142. Interfaces 116, 136 and 142 communicate respectively with activities venue-condition editing, monitoring and reporting means 118, services venue-condition editing, monitoring and reporting means 138, and merchandise venue-condition editing, monitoring and reporting means 144. Monitoring and reporting means 118, 138 and 144 are comprised of one or more databases whose data represent current venue conditions. For example, networked-venue conditions at activities venues or facilities include data pertaining to availability, ordering, scheduling and reservation of activities at any one or more of a variety of activity networked-venues such as one or more: restaurant(s) 120; recreation facilities 126 e.g. theme e.g. theme parks, entertainment complexes, malls, arcades, health clubs and the like; theatre(s) 132 e.g., film and/or stage; arena(s) 134 events and activities such as skating, sporting events and live shows, etc. Venue conditions at services venues or facilities include data pertaining to availability, ordering, scheduling and reservation of services at any one or more of a variety of service networked-venues 140 offering one or more schedulable services, for example: health care such as eye care, skin care, dental, acupuncture, general medical; or hair care, nail care, massage; or, travel and accommodation services such as flights, car rentals, recreational outings bookings and recreational vehicle rentals, hotel accommodations; or, training, tutoring, seminars, classes or other educational sessions, etc. Venue conditions at merchandise venues include data pertaining to the availability and ordering of merchandise, and the reservation and schedulable pickup of reserved merchandise or goods at any one or more of a variety of merchandise venues 146 offering goods for sale or rental: retail stores, store-chains, themed retail, department stores, entertainment-content stores, supermarkets, malls, strip malls, dealerships, membership clubs, concession stands, and the like.

The networked-venue conditions are stored, amended and maintained as databased data in the venue-condition editing, monitoring and reporting means (118, 138, 144) and are accessible by, and communicate with, at least one venue-type interface to provide stored and regularly-updated data pertaining to the availability, ordering, reservation and/or scheduling of online and physical venue deliverables. Such data are represented in the interface in a current databased selection from which customer choosing and ordering is facilitated—by any one or more of a variety of known online order-taking procedures. An ordering, reservation and scheduling means 154 records and stores customer-choices using transaction/interaction record-keeping & updating software 122. Means 154 also comprises one or more networked-computers having software routines for facilitating online ordering, and delivery, and for facilitating online orders that are subsequently culminated at one or more networked-venue(s)—following the scheduled arrival of the ordering customer and the verification of their identity at the physical location of each of the networked-venue(s) offering the desired transaction(s) or interaction(s).

For example, in one scenario a customer's identity is verified online and he makes several orders from a plurality of online-represented networked-venues: flowers from one store; a dress from a second store; an audio CD and DVD from a third store; a meal from a restaurant; and, theatre tickets to a movie. For the flowers, dress and entertainment media, merchandise/venue-condition editing, monitoring and reporting means 144 is accessed via merchandise interface 142 and provides a current databased selection of merchandise that is easily browsed through—being categorized by type and name of the merchandise networked-venue, and by type of product(s), product(s) parameters that typically affect buying decisions (such as prices, taxes, sizes, dimensions, colors, product age/year); product(s) currently available, and so forth. For the meal and theatre tickets, activities/venue-condition editing, monitoring and reporting means 118 is accessed via activities interface 116. For one or more services, services/venue-condition editing, monitoring and reporting means 138 is accessed via services/browser interface 136. Online deliverables and venue-based deliverables are represented by any one or more of a variety of known online and/or downloadable media such as: text, line art, graphical depictions, photos, digital video files, digital audio files, computer-storable files, faxes, email, instant messaging, and the like.

As a plurality of selections are completed, ordering data is sent to at least one ordering, reservation and scheduling means 154 which includes software routines for querying, maintaining and editing a chronological table of customer-events: scheduled and schedulable 148. Ordering, reservation and scheduling means 154 keep a running and editable tally of each customer-order. For a plurality of online orders derived from different online-represented networked-venues—i.e., orders for deliverables that will be sent for example, to a customer's home or place of business—a running tally of all orders is consolidated by one or more software routines of means 154 into a single order-entry procedure (versus separate orders for each online-represented venue) and the consolidated online order is culminated and recorded when confirmed by the customer. Ordering, reservation and scheduling means 154 retains a record of each venue providing the deliverable(s) in the consolidated order and automatically calculates and allocates revenues to the merchants providing the online orders. The system also keeps a running tally and implements a similar record-keeping procedure for the online ordering of online-represented deliverables that are subsequently obtained from networked-venues. When shopping online for deliverables available at networked-venues, the customer selects an appropriate interface (116, 136, 142) and venue-type from which to make one or more orders. Thus, diverse dual-commerce ordering is facilitated: at the online-represented flower shop (networked-venue) the customer orders two dozen roses; at the online-represented dress store a size 8 mango-colored dress of a specific manufacturer is selected; at online-represented entertainment-content venue the CD and DVD are easily selected—being logically categorized by media headings typically found in entertainment-content stores (including "Hits", "Specials" alphabetized "Artists", music and film genres, and so forth); the online-represented restaurant displays menu items from which a meal is selected and ordered; the theatre displays its current schedule of available tickets to feature films and a movie is selected and ordered.

The dual-commerce system optionally provides software routines that provide previews of streaming entertainment-content such as streaming audio, or streaming video.

After choosing such deliverables from the online-represented networked-venues (in this example products and activities), the ordering, reservation and scheduling means 154 queries chronological table 148 to determine one or more best-fit schedules available for time-saving excursions to the expedited service areas offered in each networked-venue. Optionally, means 154 can also query the customer for preferred time-windows during which he may wish to arrive and remain at one or more networked-venues. In the present example, the customer chooses late Friday or Saturday afternoon with the meal to begin approximately at 6:30 PM and the movie as soon thereafter as possible (Saturday is his specified preference). Means 154 contrasts the customer's preferred schedule(s) against the table of currently scheduled and available customer-events and provides a best-fit choice of available itineraries based on the most efficient and most convenient sequencing of the chosen customer-events (e.g. sequencing those events in a schedule requiring the least amount of the customer's time). Using the 6:30 meal time, the ordering, reservation and scheduling means 154 queries table 148 and finds a 6:15 time slot available on Saturday. Means 154 quickly scans the availability at other venues and proposes the following itinerary: the flower and dress shops are nearest one another so they are scheduled for customer expedited service in a time-window between 6:00-6:15; the entertainment-content store and theatre are next to the restaurant so the CD/DVD pick-up time-window is 7:00-7:15 with the film starting at 7:15 PM. So in less than an hour and fifteen minutes, the customer can eat a meal, 'shop' at three stores and begin watching his choice of a movie. If schedules seem too tight for comfort, the customer can request the system to expand the schedule duration, e.g. the one fifteen minute schedule can be expanded (as available) to 2 hours. Thus a plurality of online orders can be consolidated by the system into a single online entry-form (and deliverables are then sent for example, to a customer's home or business), and a plurality of orders retrievable from networked-venues is consolidated by the system into a single itinerary which facilitates the culmination of the orders at the venues. The applicant of the present invention calls these dual-commerce advantages and benefits "Web Assisted Retail Purchasing™" and uses the acronym WARP™ to explain how customers can now experience WARP-Accelerated shopping.

As mentioned, the customer chooses and confirms his itinerary and selects a printout record 158 or downloadable itinerary 156 which can be downloaded to a computer for subsequent printing or downloaded to a portable apparatus such as a commercially available handheld wireless device. It is noted that although the present example illustrates the sequencing of customer-events that will be culminated at a plurality of chosen networked-venues, it is also possible to simply schedule and reserve a customer transaction and/or interaction at a single networked-venue. For example, in FIG. 1C a printed itinerary or downloaded schedule 160 can direct the customer to a single facility 162, or in the case of the example given above, to a multi-venue facility 164. In either case, a customer identification and order confirmation means 166—such as any one or more of a variety of known identification and order confirmation apparatus (including wireless bi-directionally linked confirmations, electronic signatures, the combination of financial transaction cards and card magnetic strip readers, and so forth)—precedes scheduled parking 168 (optional) and his transaction and/or interaction at a designated expedited service area 170. Such designated areas are within, adjacent to, or near to, the networked-venues. The designated expedited areas are so marked and are easily discernible to the customer, and are staffed by personnel according to the flow of 'expedited' customer interactions that have been scheduled before the customer's arrival.

Each culminated order is automatically reported back—via one or more order-reporting software routines—to the relevant venue-condition editing, monitoring and reporting means (118, 138, 144) via reporting step 176. Additional transactions and/or interactions 172 (by the same customer) at other networked-venues are handled by one or more software routines which track, record and tally subsequent use of customer identification and order confirmation means 166 and/or subsequent transaction and/or interaction at a respective designated expedited service area 170 of such networked-venues. When the customer is done 174, the cumulative transactions and/or interactions are reported to one or more venue-condition editing, monitoring and reporting means (118, 138, 144) via reporting step 176. The report is also routed to ordering, reservation and scheduling means 154 to adjust the availability of schedules in chronological table 148 and transaction/interaction record 122 which additionally calculates, records and reports revenues and/or commissions for each transaction/interaction and does so according to the types of purchases made. Customer orders, reservations and schedules (and relevant data pertaining thereto) are also communicated to merchants via merchant access 124 as orders are made and confirmed. Optionally merchants can choose to have one or more suppliers automatically notified of each sale, or when merchant-configurable restocking thresholds are reached.

In one embodiment of the invention, the system can optionally accommodate real-time requests for itinerary breaks when the customer is using, or about to use, an itinerary. For example, customers may wish to rest or take an unscheduled detour. In such cases, ordering, reservation and scheduling means 154 queries and adjusts schedules as available in chronological table 148 and reports schedule options to the customer for his or her choosing via a customer's portable communications device such as wireless personal digital assistant ('PDA'), or via a venue-based itinerary-displaying and/or printing system (e.g., one or more networked computer and coupled printer, not shown). In larger venues such as amusement parks, or theme parks, means 154 simply swaps break requests between a plurality of customers and re-schedules customer-events as available. For example, in the following scenario, it's 11:20 AM, 'customer A' has two events scheduled between 11:30 AM and noon but has just made a half hour break request at a networked-venue computer, and 'customer B'—who has a half hour break scheduled between 11:30 AM and noon and the same two events as 'customer A' scheduled a half hour later (noon to 12:30 PM)—now wishes to prioritize the scheduled events before his break and he uses the Internet connectivity of his wireless device to make his request. The system easily accommodates both customer's wishes by buffering all pending requests while querying changes and current conditions in chronological table 148. One or more software routines compare the scheduled data and requested changes and—in the example of 'customer A' and 'customer B' instantly swaps those customers requested breaks with their previously scheduled events.

Thus a highly efficient, flexible dual-commerce system offering both conventional online ordering and delivery 152 and the improved convenience of schedulable itineraries to one or more networked-venue(s) is provided. The merchants of the networked-venues receive customers that the system sends them—customers who might otherwise have simply shopped online if not for the new customer experiences being offered, including added-value time-saving convenience and same-day availability of deliverables at networked-venues. No waiting in long lines or wondering if desired goods, activities or services, will be available (including in the right size, model, shape, color, etc.). The system ensures availability of, and reserves, the customers' transactions and/or interactions at all participating networked-venues. The customer passes quickly from expedited service area to expedited service area using a minimum of time, and schedule changes are easily accommodated. The system also creates a seamless economy whereby customers and merchants receive current online and venue-condition status, commissions are automatically calculated for all orders and, optionally suppliers are automatically informed as to the restocking needs of networked-venues. Furthermore, the customer can pre-pay all orders online, meaning that little or no cash need be carried by the customer to networked-venues, which is an added security benefit.

In another embodiment of the present invention, the designated area for expedited service includes the incorporation of any one or more of a variety of known receivers or transceivers of wireless transmissions suitable for communications with the type of wireless devices mentioned above. Expedited service areas can also include magnetic card strip readers for customer identification and order confirmation purposes. In either case, the facility's wireless devices or transceivers, or card readers, are employable as an efficient and quick verification means of the expedited-customer's identification, order information, price confirmation, and other expedited service advantages. Additionally, handheld devices having screens that are easily readable, can optionally be equipped with machine readable code that is suitable for downloading and displaying scheduled itinerary information which is received from the Internet, or from wireless transceivers (or received when temporarily coupled to a computer). For example, the customer's sequenced itinerary can be displayed as a running or real-time updateable schedule on the screen display of his or her device and can include automated, or user-configurable prompts that occur minutes ahead of any given event. For instance, "Dinner in ten minutes", "CD pickup available in 20 minutes", "The film starts in 45 minutes", and so on.

Bi-directional interactions of wireless devices facilitate quick 'checking in' at each venue and can include software to automatically update display-screen data and check-off and/or hide listed events when orders or events are completed, and/or provide useful information as to the next stop on one's itinerary. For example, the screen may read "Your next stop is on level two on the opposite side of the mall, you're currently here on level one", "Your car is parked in section B3, to exit, go to the opposite end of the mall and proceed down the escalator one level". Handheld devices equipped with a graphical user interface ('GUI') and schedule-displaying software can graphically or pictorially represent such instructions in virtually any type of facility including: a mall, entertainment complex, amusement park, convention hall, stadium, arena, and the like, using photographs, diagrams, maps, or other graphical depictions and can direct its user with graphical elements such as arrows to indicate which way he or she should proceed relative to their current position, and relative to their desired destinations in their expedited excursion (itinerary).

In the event that the handheld device also includes, or optionally provides, direction-finding hardware and software, for example 3-Com's Palm Pilot® can be equipped with a Global Positioning System (attachable accessory), the device can be equipped with software for displaying destinations relative to the current location of the customer and show the customer—for example with a directional arrow relative to a graphically depicted map—which way to go relative to their current position and one or more destinations in their scheduled itinerary.

Some handheld devices also include audio capability, in which case directions by audio-equipped devices can be given audibly, as can current schedule information, which would be very useful for the visually impaired. It is noted that such navigating features would be particularly helpful in large area venues or complexes, including amusement parks, stadiums, arenas, fairs, or large conventions, and the like, where becoming geographically disoriented can easily occur. Thus one's movement from one place to another (a facility, an attraction, a booth, the aisles of a market or store, and so on) can be logically and efficiently sequenced by the apparatus of the present invention. Additionally, navigation with a graphical user interface assisted by a GPS further expedites one's sequenced excursion while optionally providing timing information as to estimated travel-time, walking or waiting time, relative to a particular point of interest, facility, attraction, booth, and the like.

Other benefits are achieved with the aforementioned GUI and/or audio capable devices such as employing graphical and/or audio messaging that is instructive and/or entertaining and engaging. As the speed, LCD displays and memory capabilities of such devices improve, it will be practical to add audio and/or video clips (whether resident in the unit, downloaded therein, or played as 'streaming' files—as communications bandwidth permits), including the use of famous clips and quotes from multimedia sources such as film libraries, cartoon libraries, or audio recordings, any of which can be chosen by the user according to the user's tastes and are selectable by the user from a database of various themes, personalities, actors, comedians, musicians, performers, athletes, leaders, politicians, and other famous figures. Such clips and/or recordings are also employable (through the employment of software routines) in a manner that makes sense in the context of, and is synchronous with, the customers' transactions, interactions and scheduled itinerary—and can also include entertaining media and recordings (whether related to their transactions or not) that can be played back on their handheld device. For example, a comedic clip might say "I'm trying to think but nothing happens" as a user is waiting for access to a particular piece of information.

Figure 2:
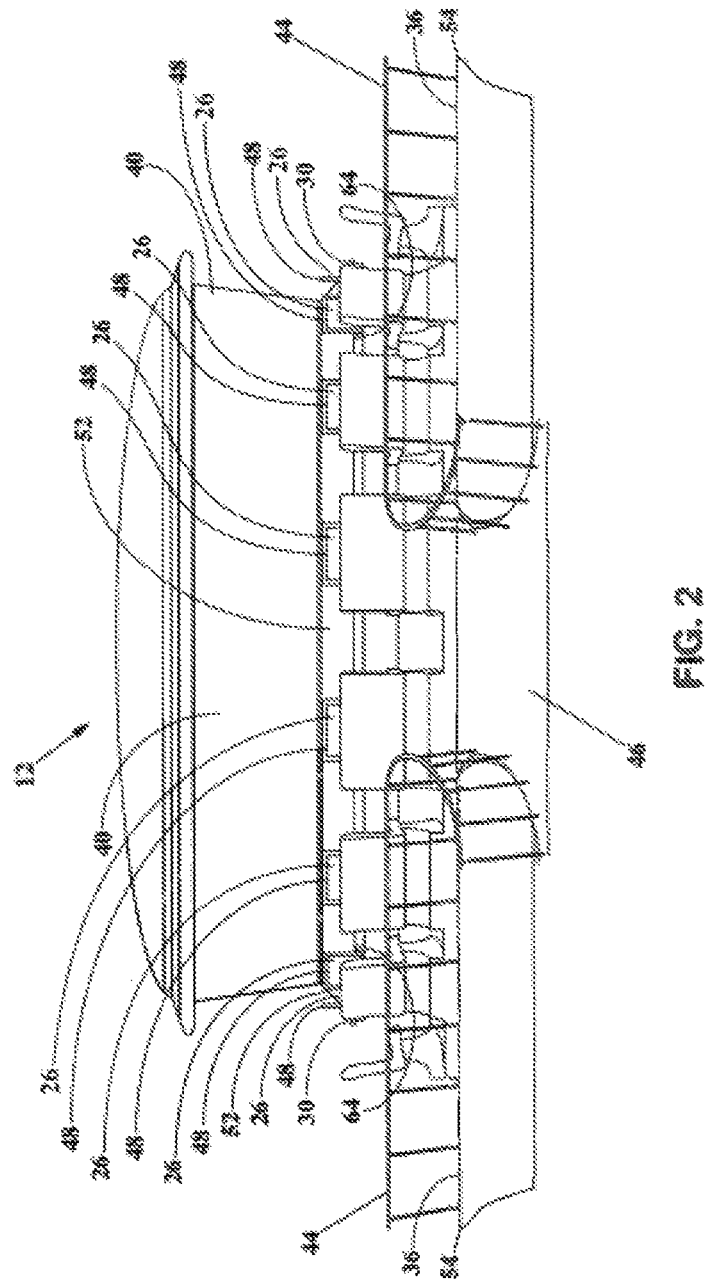
FIGS. 2 and 3 are front views and top views respectively of an optimized networked-venue having a plurality of networked workstations which securely encircle an inventory of merchandise in a workstation system.
Figure 3:
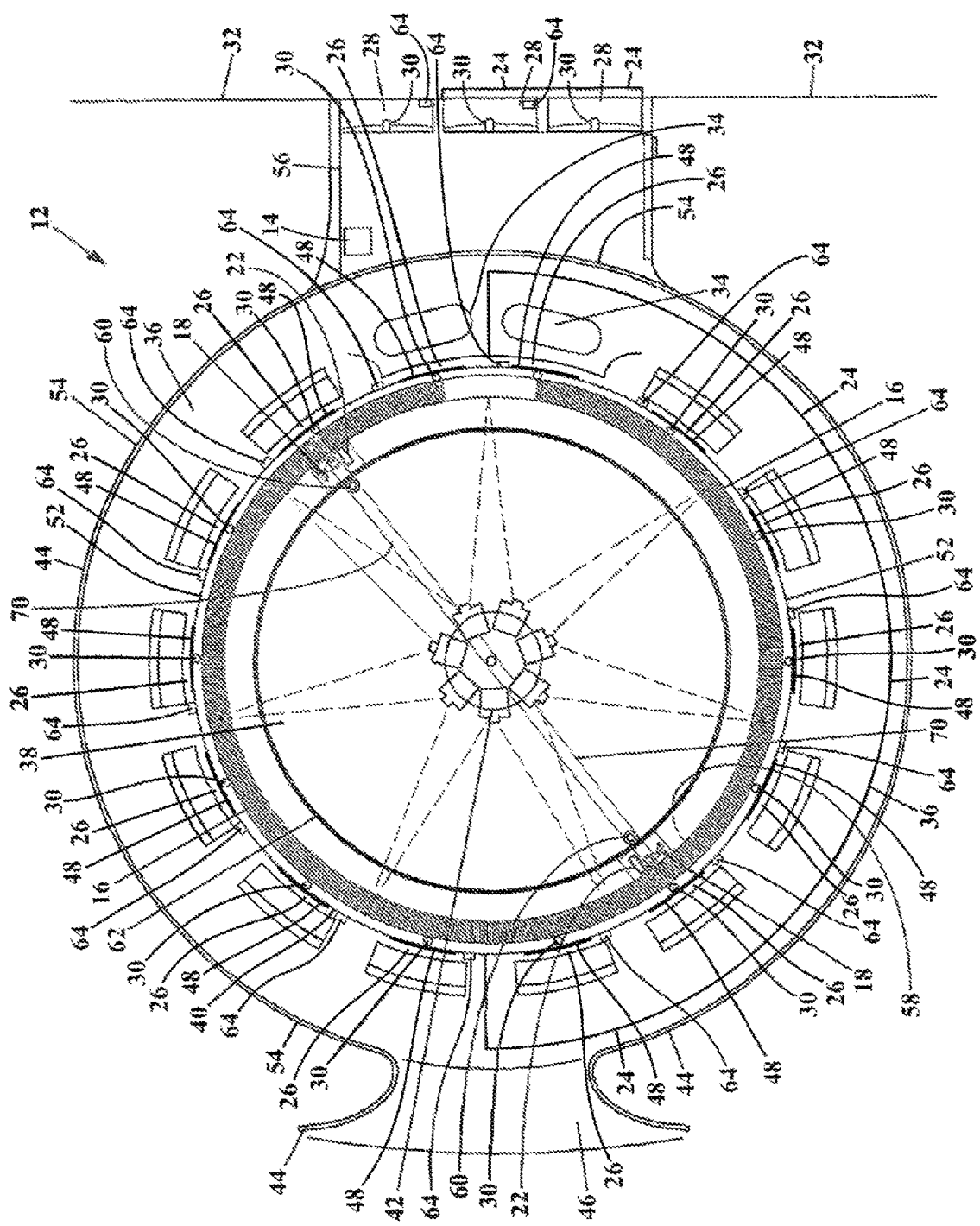

FIGS. 2 and 3 are front views and top views respectively of an optimized networked-venue having a plurality of networked workstations which securely encircle an inventory of merchandise as a workstation system. FIG. 3 shows an interior top view of the venue's automated pick-and-place robotics and record-keeping/updateable system, which is accessible on-line and by workstation access, including one or more optional ATM-Style stations at an exterior wall adjacent near to the workstation system.

By way of example, FIGS. 2 and 3 depict an embodiment of the invention which is further comprised of a networked-venue workstation system 12 representing an optimized networked-venue. Workstation system 12 has a plurality of workstations 26 that serve as customer ordering bays from which in-store products can be ordered and automatically retrieved. As seen in FIG. 3 a plurality of networked workstations 26 are arranged to encompass and secure an inventory of merchandise 16 within workstation system 12 such that the inventory is out of reach to customers until purchased—thus eliminating the need and costs for individual entertainment-content security apparatus and store-wide tag detection electronic security systems. The workstations are each comprised of a networked computer/graphical user interface and display 48, with each computer thereof providing connectivity to the Internet and to a customer I.D. and ordering confirmation means 64 including transaction and interaction software routines of the types previously described in reference to FIG. 1B. Whether employed in a mall-based facility, or an independent store-chain facility, workstation system 12 is optimized for automated record updating of inventory and order information, providing both remote networked access and local access (e.g. in-store) via a networked interface to one or more merchandise venues 142 employing the methods previously described in reference to FIG. 1B.

The workstation system is further comprised of one or more designated areas 24 (FIG. 3) such as an 'Expedited Service Area' for expedited customer interactions, and optionally includes the location of one or more ATM-Style bays 28 located adjacent to an external wall of the facility—including one or more of the external bays also having an expedited transaction designated area 24. The bays have cable coupling, or wireless communication with, at least one networked computer 14 having venue-condition editing, monitoring and reporting means 144 of the type previously described in reference to FIG. 1B. The customer identification and order verification means 64 of the workstation/ordering-bays can also be configured to provide wireless transceivers and/or financial card strip readers to expedite transactions. Optionally entertaining and engaging audio and/or visual clips that help facilitate user interaction can also be employed. Like the multimedia clips and recordings employed by the handheld devices, multimedia use at the workstations can also expedite and improve the user's shopping experience—such that entertaining clips make sense in the context of the user's transactions and are entertaining, and optionally configurable to the user's taste. Thus, the workstation interface can appear to be talking to and/or instructing the customer by employing a contextual sequencing of appropriate clips or recordings relating to their current interactions and relative to their transactions. Additionally, the user can be provided with a diverse library of multimedia files to pre-select desirable personalities (e.g. famous, notorious, dysfunctional, comedic etc.), themes, scenes, songs, song clips, and so forth, and can be selected when the system is accessed remotely, or while being operated from an ordering-bay. It is noted that although the emphasis in the previous description has been on commerce and in particular dual-commerce as it pertains to workstations in a designated expedited service area, it is also noted that workstations in non-designated areas provide similar functionality and are of service to regular walk-in customers.

The external ATM-Style bays 28, provide up to 24 hour per day automated transactions for example, when used in conjunction with the pick-and-place robotics of the workstation system 12 (as depicted in FIG. 3) bays 28 can be used to retrieve purchases or rentals, and for the return and re-stocking of the latter, around the clock.

FIG. 2 is a front view of the workstation system 12, the workstations 26 are accessible via a ramp 46 leading to an elevated walkway 36 having a handrail 44 extending upward from an outer perimeter of the walkway. Each workstation has a networked computer/graphical user interface and display 48 providing a user interface to facilitate a selection, ordering and/or retrieval of inventoried goods (16 of FIG. 3) secured within an inner diameter of the annular structure 52 supporting the walkway and workstations. Each workstation is equipped with a customer identification and order verification means 64 such as a wireless transceiver that can communicate with a customer's handheld device, or a magnetic card strip reader. It is noted that by inventorying the goods, such as audio CDs, DVDs, CD-ROMs, Video Games, Videos and the like, within the annular structure, that customers will not have access to any of the stock until it is ordered and paid for. Thus shoplifting is eliminated as are the substantial security costs associated with securing such valuable goods. For example, it is not uncommon for stores having a significant volume of such media, to pay in excess of $100-200K in security related equipment, which provides no added-value to the consumer in terms of their shopping experience. Often stores must also employ full-time security personnel to thwart or discourage shoplifting—adding the expense of their salaries to the security overhead. Furthermore, stores utilizing plastic CD security-locks on media have to replace those locks every few years due to damage and scuffing, and the process of removing the locks significantly slows down customer transactions. By contrast, the methods employed in FIGS. 2 and 3 eliminates the security concern by securely enclosing the inventory (out of sight) and uses the resource of security monies formerly required to add enhancements to the customer-experience.

All available in-store inventory is clearly shown and easily browsed through on the workstation display and selectable by customers at the workstation via one or more computer-coupled or computers communicating input device (i.e., goods representation and ordering are similar to product browsing and ordering functionality provided by eCommerce websites). When the networked-venue is of a type that provides entertainment-content the dual-commerce system optionally provides: software routines for streaming entertainment-content such as streaming audio, or streaming video; and computer-accessible playback means for previews of other digitally-recorded content (such as CDs, DVDs, and files stored in non-volatile memory and/or hard disk-based devices). Such computer-automated browsing of current inventory eliminates the hunting of product that may or may not be available down any number of aisles in a conventional store. If stock is not available for on-screen ordering and immediate retrieval, the customer is offered automatic delivery as soon as it is available.

An example of re-directing investment and constructively using the monies formerly required for security and security overhead, is the employment of an immersive and dynamic 360 degree screen 40 which is positioned adjacent to the upper edge of the annular structure 52 such that rear-projection images can be panoramically or segmentally projected onto the screens by a ring of projectors 42 (seen in FIG. 3) including live images from remote locations and/or pre-recorded images. The panoramic or segmented screen content is dynamic and engaging to passersby and workstation customers and produced to heighten the customers experience. Optionally, for increased security and/or enhanced customer engagement, workstation cameras 30 can be provided for interactive participation with other customers, including interactivity with customers at similar facilities located elsewhere and the imaging of such interactions on the screen 40.

FIG. 3 is a top view showing an interior detail of the workstation system 12 depicted in FIG. 2. Adjacent to an outer perimeter 54 ramp 46 can be seen at the leftmost portion of the illustration which leads to a walkway 36 surrounded by handrail 44—both of which generally encircle an annular structure 52 supporting workstations 26 (seen in FIG. 2). Adjacent to an opposite segment of outer perimeter 54 is enclosed corridor 56 leading to external wall 32. Wall 32 has one or more ATM-Style ordering bay 28 which can also be equipped with a security camera 30. Like the workstations 26, bays 28 are also interactive and provide access to the robotic pick-and-place apparatus 18 and facilitate customer interaction and transactions 24 hours per day, including purchases, rentals and rental returns. In an interior area 38 within the annular structure 52 is a secured inventory of goods 16. The scale of the depicted workstation system is such that the inventory is retained within approximately a thirty foot diameter making its storage capacity about 40,000 CD-sized CD, DVDs, CD-ROMs, and the like. Each storable item is given its own storage slot (not shown) having a position (height and radial position) that is assigned during stocking and maintained by a workstation networked device and transaction/interaction record-keeping & updating software 122.

From the top view of FIG. 3 it can be seen that any one or more of the workstations 26 or bays 28 can be clearly designated for expedited-customer interaction for example, by easily readable workstation indicia, or coloring, etc., and that such areas can be scalable to include more workstations in the designated area to accommodate increases in scheduled customers. Additionally, if the area is designated by rope/stanchion boundary, such a perimeter is flexible enough to expand and contract a designated area as needed according to an ebb and flow of scheduled customers. Additionally, horizontal workstation pads 34 can be provided for other-abled individuals' access to workstations, for example those arriving in a wheelchair. At the end of robotic arm(s) 70 a pick-and-place means 18 is shown which is suitable for placing goods in any one of a plurality of location-specific merchandise slots 58 among an entire inventory of goods. Similarly, pick-and-place means 18 is configured to retrieve goods from location-specific slots 58 as needed. In either case, such placement or retrieval of goods is done in communication with the record-keeping software and record-updateable data of the networked device, including the schedulable retrieval of goods according to the expedited-customer transactions occurring at the designated areas (i.e. workstations) of the facility. In addition to means 18 at the end of arm(s) 70, a light intensity sensing means 22 can also be employed, whereby slots that are empty reflect back light to a system-coupled, and system-communicating light emitter-detector pair that is measurably different from the light reflected by a filled slot. For instance, the interior of any empty slot can be comprised of a surface that promotes a light-reflectivity delta which is measurably different when contrasted against the light reflectivity of a filled slot. For example the interior of the slots can be flat black; or have a light-reflecting material such as light-reflective tape attached thereto which provides a brighter reflected light signal back to sensing means 22 than an occupied slot does. Goods that are stocked, retrieved, or re-stocked in a plurality of slots 58 are relationally databased according to slot height locations and slot radial locations and can be cross-referenced by any one or more of a variety of entertainment-content categories including: content title; content-genre; content-artist; content-production company, and so forth (e.g., within the record-keeping software and record-updateable data of the networked device).

In one embodiment of the optimized networked-venue, the goods can be substantially standardized in size, for example, by stocking the standard-sized media of Audio CDs, DVDs, CD-ROMs, CD-Based Video Games, and so forth. In which case, the approximate 30 foot diameter rack system within the annular structure 52 of networked-workstation system 12, would contain about forty thousand units with the units stored in slot-racks approximately 8 feet high. Substantially more units can be stored when a plurality of annularly-shaped (or other-shaped) racks are employed. For example, one or more racks can be placed in an area interior to the diameter of annular structure 52 (e.g. with additional annular-shaped racks having a diameter that is less than thirty feet).

The robotic pick-and-place means 18 located at the ends of arm(s) 70 are radially and vertically positionable to any merchandise-slot 58: 1.) they are radially positionable in a horizontal axis for example by the motion-control rotation of arm 70 to desired radial slot positions relative to a pre-determined 'home' position; and 2.) they are vertically positionable in a vertical axis to desired vertical slot positions by suitable vertical motion-control means such as a motion-controlled lead screw 60 which extends downward from the end of arm 70 (vertical length and travel subject to unit-rack height). Following the positioning of the pick-and-place means 18 to an alignment with merchandise in a merchandise slot, an electro-mechanically actuated gripping means is employed to grip the merchandise and move in an axis aligned with the slot until the merchandise is removed therefrom (this step is reversed for placing merchandise into a slot). The gripping means is also used when goods are delivered to a workstation, whereby the merchandise is gripped and aligned with a workstation delivery chute where it is released to slide down an incline to a merchandise reception bin accessible to the ordering customer (not shown). It is noted that the support and positioning of the pick-and-place unit(s) can be further enhanced by, suspension from above, or support from below, of an auxiliary rail system (e.g., one or more motion-controlled elements supported by rollers gliding in an aligned rail system 62). In either case, the light intensity sensing means 22 located adjacent to pick-and-place means provide real-time inventorying or regular computer-audited inventorying of the entire stock of goods as the pick-and-place means is moved. For example, during a regularly scheduled inventory such as every hour, or every shift, the computer motion control actuation of the robotic arm(s) 70 radially sweeps the sensing means 22 across each of the cumulative slots 58 of each horizontal height-row. It then vertically moves to subsequent horizontal height-rows to sweep their respective slots until the entire height of the stock has been swept/scanned. Thus, a computer-audited inventory of over forty thousand units is accomplished in less than a few minutes, upon demand or as scheduled. During normal pick-and-place activity the sensing means 22 can also be employed to verify slot occupancies and vacancies. In either case—whether scheduled, or during normal operation—databased information pertaining to the inventoried goods 18 is thereby updated, such that remote orders from a consumer's home or place of business, and local ordering (from the facility's workstations), ensures an item will always be on hand when it is shown to be among the current stock available, and can optionally be immediately ordered (for example, Just-In-Time 'JIT') from a supplier source when the stock is depleted, pre-sold (with a scheduled delay until the availability of the order), or reaches a particular unit-count threshold. Additionally, the inventorying means can be configured to provide data to the facility's networked device that arranges inventory information in a readily understandable manner for quick and easier analysis of the inventory. For example, stock that is moving the quickest among the inventoried columns and rows can be represented pictorially on a computer display screen in unit slots that are colored in hot colors (e.g. white, yellow, orange, red). Conversely, slow-moving inventory can be represented in cool colors (blue, green, gray, black). Additionally, such data can be cross-referenced or exportable to a spreadsheet format for numerical representations, and for coordinated ordering or re-ordering of additional inventory. Either approach, whether graphical or numerical, can be further parsed to show 'aging' of stock i.e. stock that has been retained in the inventory over extended periods of time and may be removed for replacement with newer inventory.

The automated system of the optimized networked-venue illustrates, by way of example, fourteen workstations and three additional ATM-style external workstations, all of which, in effect, function as order-taking and order-fulfilling stations, meaning that the facility is optimized for the scheduling and serving of no less than seventeen customers at a time—who can quickly and easily browse on-screen represented goods, and retrieve on-screen selected goods by the system's internal robotics as desired. In contrast, a conventional entertainment-media retail and or rental facility would have to have a staff of no less than seventeen employees and seventeen cash registers to serve an equal number of customers simultaneously, and all of the stock in a conventional store would have to be secured by expensive security equipment and would have to first be hunted for by the customers (assuming desired goods are in stock). Furthermore, the condensing of the stock into the interior of the facility permits the number of goods to be securely stored within an optimized area that is one fifth of the real estate required for a conventional store having the same volume of stock. Thus, a substantial reduction in overhead is achieved by optimized networked-venues (e.g. in real estate, personnel/staffing, security staffing, inventorying, ordering, etc.). The thirty foot inner diameter optionally permits the inclusion of entertainment-content replication equipment therein, and MP3 audio file downloading systems (the system uploads ordered medialess MP3 files or other digital audio file format to medialess-file ordering customers) as network bandwidth speeds increase and medialess audio files sales increase.

FIG. 3 further illustrates the employment of a ring of projectors 42 that are positioned to project panoramic, or segmented, imagery on a screen 40 (see also FIG. 2). The content of such imagery comprises any one or more of a variety of visual-content media suitable for projection of panoramic, or segmented, images onto a projection screen. The screen further secludes the facility's inventory and provides an engaging and dynamic 'storefront' that is always changing—versus the static appearance of conventional stores. When the workstations include cameras one or more projectors 42 can project workstation customers on the screen to promote customer interactivity at one or more venues having the networked-workstation system. The screen is also ideally suited for displaying store promotions and contests, including interactive contests between customers and/or stores.

In a co-pending patent by the applicant of the present invention, various screen types and image exhibition equipment are described that are suitable for employment as the facility's screen 40.

Although the present invention has been described with a certain degree of particularity, it is understood that the present disclosure has been made by way of example, and changes in detail or structure may be made without departing from the spirit of the invention in the previous descriptions or as defined in the appended claims.

What is claimed is:

1. A method of implementing dual-commerce deliverable fulfillments of one or more ecommerce vendors associated with at least one multi-vendor ecommerce service provider (multi-vendor ESP), the method comprising:
  representing, in at least one personal wireless communication (PWC) device accessible through a first user interface, via either or both a website and an ecommerce application, of at least a first ecommerce vendor that is associated with the multi-vendor ESP, an available one or more dual-commerce deliverables that are available to be selected and purchased online for at least one of the dual-commerce deliverable fulfillments, at least at a time of online selection;
  receiving a selection of the available one or more dual-commerce deliverables in an on-line order, wherein the selection includes picking one or more of the available one or more dual-commerce deliverables available;
  presenting, via the first user interface and in response to receiving the selection, one or more options including:
    a first dual-commerce deliverable fulfillment option including:
      at least one of a pickup fulfillment of and a procurement access to at least a portion of the selection at or within a networked designated expedited service area (ESA) of a physical facility location identified by the first ecommerce vendor; and
      a customer-event time-window sequenced for the pickup fulfillment of or the procurement access to at least a portion of the selection; and
    a second dual-commerce deliverable fulfillment option including a delivery fulfillment of at least a portion of the selection to a specific home or business;
  determining, using at least one networked computer associated with the first ecommerce vendor, a first time-window selected from a plurality of time windows that is available to be sequenced for the first dual-commerce deliverable fulfillment option, based at least in part on:
    a first store of data and updated data including availability of the selection for the first dual-commerce deliverable fulfillment option; and
    a second store of data and updated data including customer-event scheduled time-windows and available time-windows relating to the first dual-commerce deliverable fulfillment option;

fulfilling the first dual-commerce deliverable fulfillment option at the networked designated ESA within the customer-event time-window and using at least one customer interface device at the networked designated ESA to perform at least one of:
verify an identity of a customer; and
verify an order related to the selection,
by at least one of the pickup fulfillment and the procurement access to the selection; and fulfilling the second dual-commerce deliverable fulfillment option by the delivery fulfillment.

2. The method of claim 1, wherein the ecommerce application performs at least one of:
one or more first dual-commerce fulfillment related functions; and
one or more second dual-commerce deliverable fulfillment related functions.

3. The method of claim 1 further comprising providing one or more of:
current schedule information for the first dual-commerce deliverable fulfillment option; and
navigational instructions relating to the first dual-commerce deliverable fulfillment option.

4. The method of claim 1, wherein the first user interface is a graphical user interface (GUI) operable to present information about the available one or more dual-commerce deliverables, the first dual-commerce deliverable fulfillment option, and the second dual-commerce deliverable fulfillment option.

5. The method of claim 1 further comprising permitting categorized browsing of at least dual-commerce available deliverables, in accordance with one or more of: merchandise, products or goods related categories, product parameter related categories, wherein the merchandise, products or goods related categories include one or more of: type of merchandise venues, name of merchandise venues, type of products, products currently available and wherein the product parameter related categories include one or more of: prices, taxes, sizes, dimensions, colors, product ages, product years.

6. The method of claim 1 further comprising using a second user interface, which is for a second ecommerce vendor that is associated with the multi-vendor ESP, that is in communication with the at least one PWC device, wherein the second user interface is in communication with either or both a website and an ecommerce application and represents an available one or more dual-commerce deliverables of the second ecommerce vendor for selection and purchase online for at least one of the dual-commerce deliverable fulfillments, at least at a time of online selection.

7. The method of claim 1 further comprising representing, at least at a time of online selection, via a second user interface, which is associated with the first ecommerce vendor, an alternative one or more dual-commerce deliverables available for selection and purchase online for at least one of the first dual-commerce deliverable fulfillment option and the second dual-commerce deliverable fulfillment option for the first ecommerce vendor.

8. The method of claim 1 further comprising providing one or more customer interface devices or input/output (I/O) devices of the networked designated ESA including at least one of a designated ESA workstation and a designated ESA bay for use during the first dual-commerce deliverable fulfillment option, which include one or more of: a networked-computer including a display and graphical user interface, a computer-interfaced keyboard, a computer-interfaced keypad, a PIN entry device, an electronic-signature pad, a magnetic card-strip reader, a financial transaction card reader operative to read one or more of financial transaction card information, credit card information, membership card information, at least one device operative to communicate wirelessly with the at least one PWC device of the customer at the ESA via one or more of infrared, Bluetooth, radio wave, frequencies or frequency ranges, at least one device operative to receive a code pertaining to the first dual-commerce deliverable fulfillment option.

9. The method of claim 1, further comprising receiving an online pre-payment for the available one or more dual-commerce deliverables represented in the first user interface available to be selected and purchased online for the first dual-commerce deliverable fulfillment option, wherein receiving the online pre-payment prior to the pickup at the networked designated ESA expedites the pickup of the selection by obviating at least one of a cash payment at the networked designated ESA or an at-venue financial transaction at the at least one customer interface device, and an expending of a period of time for either.

10. The method of claim 1, wherein the first user interface includes at least one of a representation of one or more of the dual-commerce deliverables of merchandise and first ecommerce vendor product fulfillment related information via one or more of: graphical depiction(s), photograph(s), digital video file(s), digital audio file(s), diagram(s), map(s), computer-storable file(s), line art, text, instant messaging, email(s), and facsimile(s).

11. The method of claim 1 further comprising communicating the at least one time-window determined for the first dual-commerce deliverable fulfillment in a schedule or an itinerary for viewing on a display of a PWC device of a first ecommerce vendor customer, at least in advance of a fulfilling of the first dual-commerce deliverable fulfillment.

12. The method of claim 1 further comprising consolidating an order placed online including both a first dual-commerce deliverable fulfillment and a second dual-commerce fulfillment, into at least one of a single online order and a single online order including an online payment for either or both the first dual-commerce deliverable fulfillment and the second dual-commerce fulfillment.

13. The method of claim 1, further comprising designating, at least one of an expedited service area (ESA), a workstation of the ESA, a bay of the ESA within, adjacent or near to a physical location of the first ecommerce vendor, by one or more of: indicia, text, a coloring, a marking, a boundary or bounded area, in a manner readily discernible to customers at the first ecommerce vendor physical location.

14. The method of claim 1 further comprising:
determining the at least one customer-event time-window for a schedule or an itinerary; and
communicating the schedule or the itinerary to the PWC device for a viewing of the itinerary or the schedule on a display of the PWC device, at least in advance of a respective upcoming first dual-commerce deliverable fulfillment; wherein the determined at least one customer-event time-window is at least one of: a specified limited-time period, a specified clock-time beginning a limited-time period, a time-window determined based on or a closest fit to a time preference obtained from a customer, a time-window modifiable by the customer prior to the respective upcoming deliverable fulfillment, a limited-time period specified for a pickup fulfillment on a same day the pickup fulfillment is ordered online, a time-window sequenced on a day of a week chosen by a customer, a customer-event time-window sequenced within a given scheduled customer-visit capacity of a designated ESA fixed in size or scaled in size, a time-window sequenced prior to, or intermediate a plurality of, or following one or more other, sequenced time-windows scheduled for respective pickup fulfillments at a designated ESA of the one or more ecommerce vendors.

15. A method of implementing dual-commerce deliverable fulfillments associated with at least one ecommerce service provider (ESP), comprising:
    representing, in at least one personal wireless communication (PWC) device accessed by a first user interface associated with a first ecommerce vendor and at a time of online selection, one or more product type deliverables that are currently available to be selected and purchased online for dual-commerce deliverable fulfillments;
    receiving a selection of the one or more product type deliverables in an on-line order, wherein the selection includes picking one or more of the one or more product type deliverables that are available;
    presenting, via the first user interface and in response to receiving the selection, at least one of dual-commerce deliverable fulfillment options including:
        a first dual-commerce deliverable fulfillment option including:
            at least one of a pickup fulfillment of and a procurement access to at least a portion of the selection at or within a networked designated expedited service area (ESA) of the first ecommerce vendor; and
            a customer-event time-window sequenced for the pickup fulfillment of or the procurement access to at least a portion of the selection; and
        a second dual-commerce deliverable fulfillment option including a delivery fulfillment of at least a portion of the selection to a specific home or business;
    determining, using at least one networked computer of the first ecommerce vendor, a first time-window selected from a plurality of time windows that is available to be sequenced for the first dual-commerce deliverable fulfillment option, based at least in part on:
        a first store of data and updated data including availability of the selection for the first dual-commerce deliverable fulfillment option; and
        a second store of data and updated data including customer-event scheduled time-windows and available time-windows relating to the first dual-commerce deliverable fulfillment option;
    fulfilling the first dual-commerce deliverable fulfillment option at the networked designated ESA within the customer-event time-window and using at least one customer interface device at the networked designated ESA to perform at least one of:
        verify an identity of a customer; and
        verify an order related to the selection,
    by at least one of the pickup fulfillment and the procurement access to the selection; and
    fulfilling the second dual-commerce deliverable fulfillment option by delivery.

16. A method of implementing dual-commerce deliverable fulfillments of one or more ecommerce vendors associated with at least one ecommerce service provider (ESP), the method comprising:
    representing, in at least one personal wireless communication (PWC) device accessible first user interface, which first user interface is associated with the at least one ESP, at a time of online selection, at least one deliverable currently available to be selected and purchased online for dual-commerce deliverable fulfillments;
    receiving a selection of the at least one deliverable in an on-line order;
    presenting, via the first user interface and in response to receiving the selection, at least one of dual-commerce deliverable fulfillment options including:
        a first dual-commerce deliverable fulfillment option including:
            a pickup fulfillment of the selection provided at or within a networked designated expedited service area (ESA) of a networked facility associated with the at least one ESP; and
            a customer-event time-window sequenced for the pickup fulfillment of at least a portion of the selection; and
        a second dual-commerce deliverable fulfillment option including a delivery fulfillment of at least a portion of the selection to a specific home or business;
    determining, using at least one networked computer associated with the at least one ESP, a first time-window selected from a plurality of time windows that is available to be sequenced for the first dual-commerce deliverable fulfillment option, based at least in part on:
        a first store of data and updated data including availability of the selection for the first dual-commerce deliverable fulfillment option; and
        a second store of data and updated data including customer-event scheduled time-windows and available time-windows relating to the first dual-commerce deliverable fulfillment option;
    fulfilling, for the first dual-commerce deliverable fulfillment option, at the networked designated ESA within the customer-event time-window and using at least one customer interface device at the networked designated ESA by performing at least one of:
        verify an identity of a customer; and
        verify an order related to the selection,
    by picking up the selection; and
    fulfilling, for the second dual-commerce deliverable fulfillment option, by the delivery fulfillment.

17. The method of claim 16, further comprising the first user interface being accessible via at least one of a website and an ecommerce application of the at least one ESP.

18. The method of claim 16 further comprising:
    receiving a confirmation of an identity of a customer of the order associated with the first dual-commerce deliverable fulfillment; and
    providing, to the customer within the customer-event time-window sequenced, at least one of: the pickup fulfillment and a procurement access.

19. A method of implementing dual-commerce deliverable fulfillments of one or more ecommerce vendors associated with at least one ecommerce service provider (ESP), the method comprising:
    representing, in at least one personal wireless communication (PWC) device accessible via a first user interface and at a time of online selection, at least one of goods, activities, and services, each of which being currently available to be selected and purchased online for dual-commerce deliverable fulfillments;

receiving a selection of at least one of goods, activities, and services through the first user interface, wherein the at least one of goods, activities, and services of at least one of the one or more ecommerce vendors can be fulfilled through dual-commerce fulfillment for an online order;

presenting, via the first user interface and in response to receiving the selection, at least one of dual-commerce deliverable fulfillment options including:
- a first dual-commerce deliverable fulfillment option including:
  - a pickup fulfillment, which is to schedule a customer, of the selection at or within a designated area of a networked facility associated with the at least one of the ecommerce vendors; and
  - a customer-event time-window sequenced for the pickup fulfillment of the selection; and
- a second dual-commerce deliverable fulfillment option including a delivery fulfillment of the selection to a specific home or business;

determining, using at least one networked computer associated with the at least one ESP, a first time-window selected from a plurality of time windows that is available to be sequenced for the first dual-commerce deliverable fulfillment option, based at least in part on:
- a first store of data and updated data including availability of the selection for the first dual-commerce deliverable fulfillment option; and
- a second store of data and updated data including customer-event scheduled time-windows and available time-windows;

fulfilling, for the first dual-commerce deliverable fulfillment option, at the designated area within the customer-event time-window and using at least one customer interface device at the designated area of the networked facility by performing at least one of:
- verify an identity of the customer; and
- verify an order related to the selection of at least one of goods, activities, and services fulfilled through dual-commerce fulfillment,
- at or within the designated area for the at least one of goods, activities, and services can be fulfilled through dual-commerce fulfillment; and fulfilling, for the second dual-commerce deliverable fulfillment option, by the delivery fulfillment.

20. The method of claim 19 further comprising providing, one or more customer interface devices or input/output (I/O) devices of the designated area of the networked facility including at least one of a designated workstation and a designated bay for use during the first dual-commerce deliverable fulfillment option, which include one or more of: a networked-computer including a display and graphical user interface, a computer-interfaced keyboard, a computer-interfaced keypad, a PIN entry device, an electronic-signature pad, a magnetic card-strip reader, a financial transaction card reader operative to read one or more of financial transaction card information, credit card information, membership card information, at least one device operative to communicate wirelessly with the PWC device of the customer at the networked facility via one or more of infrared, Bluetooth, radio wave, frequencies or frequency ranges, at least one device operative to receive a code pertaining to the first dual-commerce deliverable fulfillment.

21. The method of claim 19 further comprising receiving an online pre-payment for one or more of the one or more dual-commerce deliverables, represented in the first user interface available for selection and purchase online and selected for the first dual-commerce deliverable fulfillment option, wherein receiving the online pre-payment prior to the pickup at the designated area of the networked facility expedites the pickup of the deliverables by obviating at least one of a cash payment at the networked facility or an at-venue financial transaction at one or more ESA customer interface devices, and an expending of a period of time for either.

22. The method of claim 19 further comprising, including in the first user interface either or both of a representation of one or more of the dual-commerce deliverables of merchandise, first ecommerce vendor product fulfillment related information, via one or more of: graphical depiction(s), photograph(s), digital video file(s), digital audio file(s), diagram(s), map(s), computer-storable file(s), line art, text, instant messaging, email(s), and facsimile(s).

23. The method of claim 19 further comprising communicating the at least one time-window determined for the first dual-commerce deliverable fulfillment option in a schedule or an itinerary for viewing on a display of a PWC device of a first ecommerce vendor customer, at least in advance of a fulfilling of the first dual-commerce deliverable fulfillment option.

24. The method of claim 19 further comprising consolidating an order placed online including both a first dual-commerce deliverable fulfillment and a second dual-commerce fulfillment, into at least one of a single online order and a single online order including an online payment for either or both the first dual-commerce deliverable fulfillment and the second dual-commerce fulfillment.

25. The method of claim 19 further comprising designating, at least one of an expedited service area (ESA), a workstation of the ESA, a bay of the ESA within, adjacent or near to a physical location of the at least one of the one or more ecommerce vendors, by one or more of: indicia, text, a coloring, a marking, a boundary or bounded area, in a manner readily discernible to customers at the networked facility.

26. The method of claim 19 further comprising:
- determining the at least one customer-event time-window for a schedule or an itinerary; and
- communicating the schedule or the itinerary to the PWC device for a viewing of the itinerary or the schedule on a display of either PWC device, at least in advance of a respective upcoming first dual-commerce deliverable fulfillment; wherein the determined at least one customer-event time-window is at least one of: a specified limited-time period, a specified clock-time beginning a limited-time period, a time-window determined based on or a closest fit to a time preference obtained from a customer, a time-window modifiable by the customer prior to the respective upcoming deliverable fulfillment, a limited-time period specified for a pickup fulfillment on a same day the pickup fulfillment is ordered online, a time-window sequenced on a day of a week chosen by a customer, a customer-event time-window sequenced within a given scheduled customer-visit capacity of the designated area fixed in size or scaled in size, a time-window sequenced prior to, or intermediate a plurality of, or following one or more other sequenced time-windows scheduled for respective pickup fulfillments at a designated ESA of the one or more ecommerce vendors.

\* \* \* \* \*